United States Patent
Delaney

(10) Patent No.: US 10,166,554 B2
(45) Date of Patent: Jan. 1, 2019

(54) INJECTOR

(71) Applicant: Score (Europe) Limited, Peterhead (GB)

(72) Inventor: Kenneth Delaney, Peterhead (GB)

(73) Assignee: Score (Europe) Limited, Peterhead (GB)

( * ) Notice: Subject to any disclaimer, the term of this patent is extended or adjusted under 35 U.S.C. 154(b) by 0 days.

(21) Appl. No.: 15/488,644

(22) Filed: Apr. 17, 2017

(65) Prior Publication Data
US 2017/0297041 A1      Oct. 19, 2017

(30) Foreign Application Priority Data

Apr. 18, 2016   (GB) .................................. 1606744.9

(51) Int. Cl.
*B05B 1/30*       (2006.01)
*F16K 15/02*      (2006.01)

(52) U.S. Cl.
CPC .......... *B05B 1/3006* (2013.01); *B05B 1/3013* (2013.01); *F16K 15/026* (2013.01)

(58) Field of Classification Search
CPC .... B05B 1/3006; B05B 1/3013; F16K 15/026
USPC ...................................................... 239/533.1
See application file for complete search history.

(56) References Cited

U.S. PATENT DOCUMENTS

| | | | | |
|---|---|---|---|---|
| 3,097,660 A | * | 7/1963 | Priesmeyer | F16K 15/063 137/316 |
| 3,465,778 A | * | 9/1969 | Kast | F02C 9/263 137/115.1 |
| 3,664,371 A | * | 5/1972 | Schneider | F16K 15/028 137/516.29 |
| 4,100,800 A | * | 7/1978 | Pelt | G01F 7/00 137/512.1 |
| 4,172,465 A | * | 10/1979 | Dashner | F16K 15/063 137/533.27 |
| 4,232,704 A | * | 11/1980 | Becker | E03C 1/106 137/218 |
| 4,281,680 A | * | 8/1981 | Ripert | F16K 27/0209 137/454.2 |
| 2016/0084390 A1 | | 3/2016 | He et al. | |

FOREIGN PATENT DOCUMENTS

| | | |
|---|---|---|
| DE | 914696 C | 7/1954 |
| DE | 20305410 U1 | 7/2003 |
| WO | WO-2014021124 A1 | 2/2014 |

OTHER PUBLICATIONS

Sealweld Services, 1994, "Discussion Paper for Modifying Pipeline Engineering Standards for Sealant Injection Fittings in Pipeline Valves", sealweld.com.

* cited by examiner

*Primary Examiner* — Chee-Chong Lee
(74) *Attorney, Agent, or Firm* — Winstead PC

(57) ABSTRACT

A valve injector (10) comprising:
  a body (12) defining a fluid conduit (14),
  the fluid conduit (14) accommodating first, second and third checks (16, 18, 20),
  the first check (16) being disposed within the fluid conduit (14) towards a first end (10a) of the injector (10),
  the second check (18) being disposed towards a second end (10b) of the injector (10), distally from the first end (10a), and
  the third check (20) being located between said first and second check (16, 18).

10 Claims, 2 Drawing Sheets

INJECTOR

FIELD OF THE INVENTION

The present invention relates to injectors, especially those used for injecting sealant or the like into valves in-line, such as, for example, but not limited thereto, pipeline valves.

BACKGROUND TO THE INVENTION

Valves will often have injectors fitted to them. These injectors may be used to inject sealant into the valve to enhance the fluid integrity of the valve. These injectors may also be used to inject lubricant into the valve to ensure free movement of moving parts.

An inherent drawback to such injectors is that they disrupt the fluid integrity of the valve by their very nature.

One such injector is the applicant's own Dove injector fitting. It comprises a Y-shaped branch design which provides a double check and needle valve design providing five sealing points. The Y-shaped branch requires a certain amount of space to properly fit and remove from a valve and it is designed such that the needle only back seats when fully unscrewed onto the seating surface.

The present invention seeks to mitigate and/or obviate the drawbacks of the prior art.

SUMMARY OF THE INVENTION

According to the present invention there is provided a valve injector comprising:
 a body defining a fluid conduit,
 the fluid conduit accommodating first, second and third checks,
 the first check being disposed within the fluid conduit towards a first end of the injector,
 the second check being disposed towards a second end of the injector, distally from the first end, and
 the third check being located between said first and second check.

By "check" in the present application is meant an internal movable member of the injector which controls, i.e. allows or disallows flow through the fluid conduit.

Each check is biased against a respective first, second and third seat located in the fluid conduit by a respective first, second and third biasing member, blocking a respective orifice in the seat and thereby preventing flow through the fluid conduit. The bias force of each of the first, second and third biasing member is such that it can be overcome by the application of a predetermined pressure in a first direction against the bias force, for example, from the first end of the injector towards the second end of the injector, on the respective first, second and third check whereby said check is moved away from its seat and the orifice of the seat is unblocked. Upon removal of the pressure, each respective check is returned into its position blocking the orifice in the respective seat.

Preferably, the body has a longitudinal axis and the fluid conduit extends along the longitudinal axis.

Preferably, the first end is an inlet end and the second end is an outlet end. In use, pressure of fluid entering the injector at the inlet end moves each of the first, second and third checks in sequence away from their respective seats, such that fluid can pass through the fluid conduit and exit the injector at the outlet end. Once the fluid pressure ceases to act upon any of the three checks, the check returns into the position biased against its respective seat, thereby blocking the fluid conduit.

The body may be formed from two separate sections, first and second body sections. The first and second body sections are preferably connected such that the two body sections can move longitudinally relative to each other. The two sections are preferably tubular. Preferably, the two sections are axially aligned relative to each other to form the body.

Preferably, the first body section includes the inlet end and the second body section includes the outlet end.

The first and second body sections may be connected utilising a threaded connection. The threaded connection enables longitudinal relative displacement of the first and second body sections. The first and second body sections are preferably prevented from being completely disconnected by a stop member. In one arrangement, the stop member comprises two half bushes. The two half bushes also provide axial support for the first and second body sections reducing pick up and galling on the threaded connection, and also prevent misalignment.

The half bushes are preferably retained via a retaining element, such as, for example, a screwed or a pinned connection, a circlip or a similar suitable retaining element.

In a preferred embodiment, in one mode of operation, the third check is biased against a further, fourth seat located in the fluid conduit longitudinally spaced from the third seat by a fourth biasing member in the direction opposite the bias force of the third biasing member. Thus, while being retained or compressed between the third and the fourth biasing members, the third check is biased against each of the third and the fourth seats thereby blocking respective orifices in the third and fourth seats. This mode of operation of the injector is a locked mode in which the injector cannot be used for allowing fluid to pass through the fluid conduit. In the locked mode, the third check blocks the fluid conduit even if pressure is applied on the third check in the first direction attempting to overcome the bias force of the third biasing member. This is because the third check is biased against the fourth seat by the fourth biasing member in the direction opposite the bias force of the third biasing member and in the same direction as the pressure which attempts to overcome the bias force of the third biasing member. Thus, the orifice of the fourth seat remains blocked and passage of fluid through the fluid conduit is prevented.

In another mode of operation, the fourth biasing member is moved away, i.e. becomes axially spaced from its position in which the fourth biasing member biases the third check against the fourth seat, while the third biasing member continues to bias the third check against the third seat, whereby the third check is moved away, i.e. becomes axially spaced from the fourth seat and the orifice of the fourth seat is unblocked. This mode of operation of the injector is a working mode in which the injector can be used for allowing fluid to pass through the fluid conduit. In the working mode, the bias force of each of the first, second and third biasing member can be overcome by application of a predetermined pressure in the first direction on the respective first, second and third check whereby said check is moved away from its seat and the orifice of the seat is unblocked whereby fluid can pass through the fluid conduit.

In one arrangement, the third seat is provided in the first body section, preferably spaced longitudinally from the inlet end towards the outlet end and the fourth seat is provided in the second body section spaced from the outlet end towards the inlet end. Preferably, the first body section acts as the fourth biasing member whereby in the locked mode, the third check is retained or compressed between the first and second body sections. Preferably, retention or compression of the third check between the first and second body sections is achieved by tightening the connection between the two body sections whereby the two body sections are moved longitudinally closer together. Conversely, by loosening the connection between the two body sections, the first body section acting as the fourth biasing member is moved away, i.e. becomes axially spaced from the position in which the first body section biases the third check against the fourth seat on the second body section, while the third biasing member continues to bias the third check against the third seat on the first body section. In this manner, the third check is moved away from the fourth seat and the orifice of the fourth seat is unblocked bringing the injector into the working mode of operation.

Each check may be provided in the form of a cylindrical or other prismatic plug acting as the check, a spherical ball, or a combination of a cylindrical or a prismatic plug with spherical or conical ends to interface with a respective seat. The seat may be integral to the body or a separate insert either of metallic or non-metallic construction.

The first check and the first seat may be disposed within the first body section.

The second check and the second seat may be disposed within the second body section.

The third check may be disposed adjacent a junction between first and second body sections.

The first, second, and/or third check seats may comprise a generally disc-shaped member with a central bore forming the seat orifice.

The third check may have a greater diameter than the first and/or second check

The first body section may have first and second ends. The first end may be the inlet end.

The second body section may have first and second ends. The second end may be the outlet end.

The second end of the first body section may connect within the first end of the second body section to form the body section.

The second body section may be provided with a third check housing around the fluid conduit accommodating the third check.

The third check housing may comprise a recess in the fluid conduit. The recess may have a substantially complementary shape to that of the third check.

One or more fluid channels may be provided in walls of the recess. The one or more fluid channels may be aligned substantially parallel to the fluid conduit. The one or more fluid channels may be semi-circular in cross-section.

There may be eight channels disposed around the recess.

The third seat may be located within the first body section. When engaged with the third seat, the third check may be partially received in the first body section.

The first, second and third biasing members may be provided in the form of respective springs.

The injector of the present invention provides a greater degree of leak tightness and integrity compared with known injectors.

BRIEF DESCRIPTION OF THE DRAWINGS

Embodiments of the present invention will now be described, by way of example only, with reference to the following drawings, in which.

Figure 1:
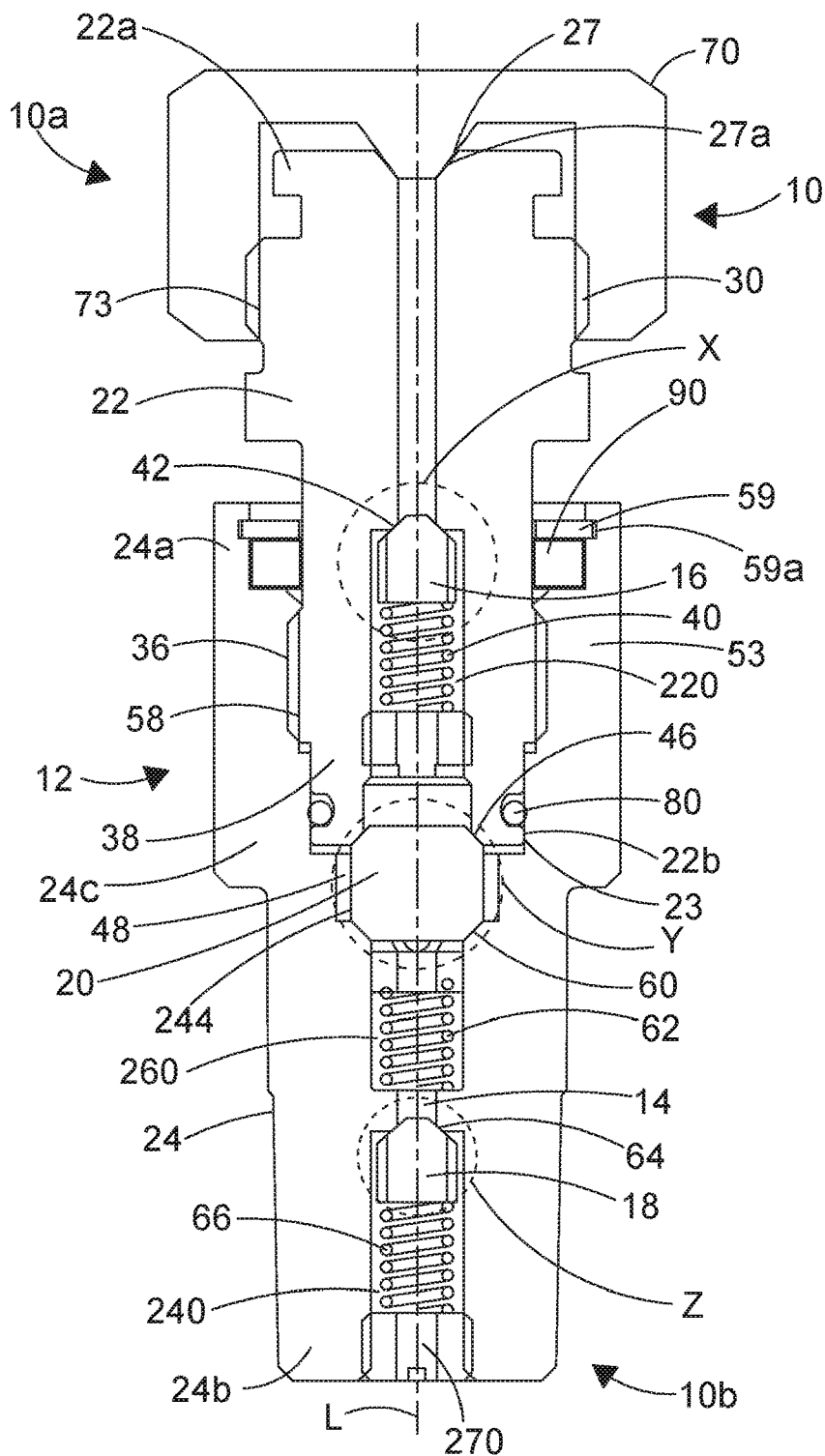
FIG. 1 is a cross-sectional side view of the valve injector of the invention.
Figure 2:
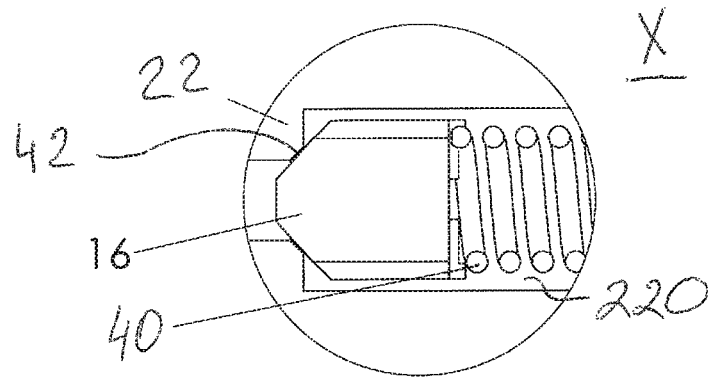
FIG. 2 is an enlarged view of area X in FIG. 1.
Figure 3:
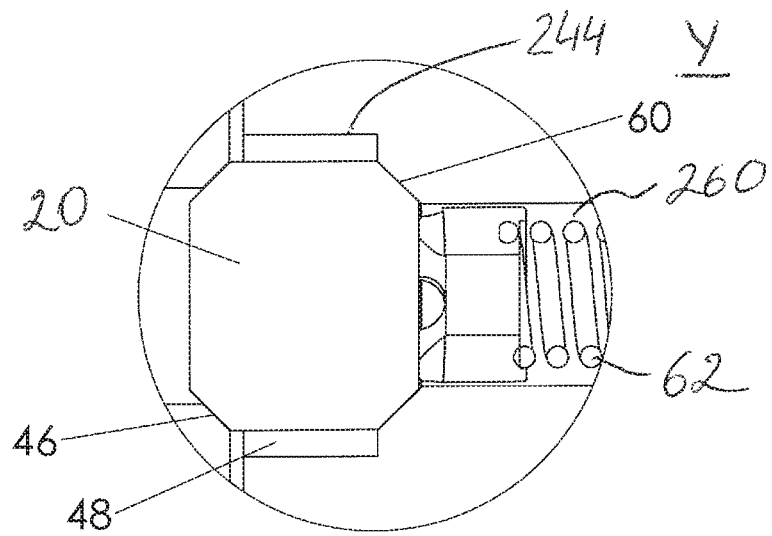
FIG. 3 is an enlarged view of area Y in FIG. 1.
Figure 4:
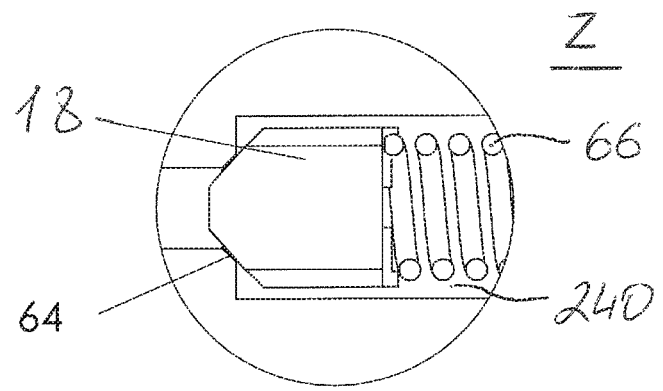
FIG. 4 is an enlarged area Z in FIG. 1.

Referring to the drawings, a valve injector 10 in accordance with the invention is depicted. The valve injector 10 comprises a body 12 with a fluid conduit 14.

The central fluid conduit 14 houses first 16, second 18 and third 20 checks, i.e. movable members of the injector 10 which control, i.e. allow or disallow flow through the fluid conduit 14.

The first check 16 is disposed within the fluid conduit 14 towards a first end 10*a* of the injector 10. The second check 18 is located towards a second end 10*b* of the injector 10, distally from the first end 10*a*. The third check 20 is located between the first and second checks 16, 18.

As will be explained in more detail below, each check 16, 18, 20 is normally biased against a respective first, second and third seat 42, 64, 46 located in the fluid conduit 14 by a respective first, second and third biasing member, in the presently described embodiment provided in the form of first, second and third springs 40, 66, 62, blocking a respective orifice (not indicated by a reference numeral) in the seat 42, 64, 46 and thereby preventing flow through the fluid conduit 14. The bias force of each of the first, second and third spring 40, 66, 62 is such that it can be overcome by the application of a predetermined pressure in a first direction against the bias force, from the first end 10*a* of the injector 10 towards the second end 10*b*, on the respective first, second and third check 16, 18, 20. As a result, each check 16, 18, 20 is moved away from its respective seat 42, 64, 46 and the orifice of the seat 42, 64, 46 is unblocked. Upon removal of the pressure, each respective check 16, 18, 20 is returned by the respective spring 40, 66, 62 into its position blocking the orifice in the respective seat 42, 64, 46.

In FIGS. 1 to 4, the seats 42, 64, 46 are depicted as chamfered surfaces shaped for abutment with the respective checks 16, 18, 20. Although not shown in the drawings, in some instances, the first, second, and/or third check seats 42, 64, 46 may comprise a generally disc-shaped member with a central bore forming the seat orifice. Accordingly, the seat 42, 64, 46 may be integral to the body 12 or a separate insert either of metallic or non-metallic construction.

The body 12 has a longitudinal axis L and the fluid conduit 14 extends along the longitudinal axis L.

The first end 10*a* is an inlet end and includes an inlet aperture 27 defined by a chamfer 27*a*, and the second end 10*b* is an outlet end and includes an outlet aperture 270. In use, pressure of fluid entering the injector 10 at the first end 10*a* moves each of the first, second and third checks 16, 18, 20 in sequence away from their respective seats 42, 64, 46, such that fluid can pass through the fluid conduit 14 and exit the injector 10 at the second end 10*b*. Once the fluid pressure ceases to act upon any of the three checks 16, 18, 20, the checks 16, 18, 20 return into their positions biased against their respective seats 42, 64, 46, thereby blocking the fluid conduit 14.

The body 12 comprises two separate components: a first body section 22 and a second body section 24 which are axially aligned to form the body 12. Both first and second body sections 22, 24 are tubular and may be substantially cylindrical. The first body section 22 includes the first end 10*a* and the second body section 24 includes the second end 10*b*.

The first and second body sections 22, 24 are connected such that the two body sections 22, 24 can move longitudinally relative to each other. In the presently described embodiment, the first and second body sections 22, 24 are connected utilising a threaded connection which enables the relative longitudinal displacement of the first and second body sections 22, 24.

The first body section 22 has a first end 22a and a second end 22b. The first end 22a forms the first end 10a of the injector 10. The second body section 24 has a first end 24a and a second end 24b. The second end 24b forms the second end 10b of the injector 10.

A cap portion 70 covers the first end 22a of the first body section 22 and is connected thereto via a threaded connection 73 at the flange portion 30 of the first body section 22.

The first body section 22 has a sleeve portion 38 at the second end 22b. A threaded portion 36 is provided around an outer surface of the sleeve portion 38. The second body section 24 has a socket portion 53 for receiving the sleeve portion 38 of the first body section 22. A threaded portion 58 is provided around an inner surface of the socket portion 53. The threaded portions 36, 58 cooperate to form the threaded connection between the first and second body sections 22, 24. The threads of the threaded portions 36, 58 are preferably counter-clockwise to mitigate the possibility of unintentional detachment of the first body section 22 from the second body section 24, for example, during removal of the cap portion 70, the latter being attached to the first body section 22 via a clockwise thread.

The first and second body sections 22, 24 are prevented from being completely disconnected by a stop member provided in the presently described embodiment in the form of two half bushes 90 (only one is visible in FIG. 1). The two half bushes 90 also provide axial support for the first and second body sections 22, 24 reducing pick up and galling on the threaded connection and also prevent misalignment of the first and second body sections 22, 24. The half bushes 90 are retained in place via a retaining element, in the presently described embodiment provided in the form of a circlip 59. The circlip 59 is seated within a circlip recess 59a located on an inner surface of the socket portion 53.

A seal 80 is placed between the two body sections 22, 24 to prevent media escape during operation.

The first check 16 and the first spring 40 are disposed within a first bore 220 provided in the first body section 22 adjacent the second end 22b of the first body section 22.

The second check 18 and the second spring 66 are disposed within a second bore 240 provided in the second body section 24 adjacent the second end 24b of the second body section 24.

The third check 20 is disposed in a recess 244 formed in a middle portion 24c of the second body section 24 at a junction between the first and second body sections 22, 24. The recess 244 has a substantially complementary shape to that of the third check 20. The third seat 46 of the third check 20 is provided at the second end 22b of the first body section 22. When engaged with the third seat 46, the third check 20 is partially located within the first body section 22. One or more channels 48 are provided in walls of the recess 244 and aligned substantially parallel to the fluid conduit 14 to facilitate flow along the recess when the injector 10 is in use. The recess 244 maintains axial alignment of the third check 20 at all times, while the channels 48 enable flow through recess when the injector 10 is in operation. The third spring 62 which biases the third check 20 against the third seat 46 is located in a third bore 260.

As is apparent from the drawings, the third check 20 has a greater diameter than the first and second checks 16, 18.

In the presently described embodiment, each check 16, 18, 20 is provided as a combination of a cylindrical or a prismatic plug with a frusto-conical end. In other embodiments, the check 16, 18, 20 may also be provided in the form of a cylindrical or other prismatic plug a spherical ball, or a combination of a cylindrical or a prismatic plug with spherical or conical ends to interface with a respective seat.

A fourth seat 60 is provided for the third check 20 in the recess 244 longitudinally spaced from the third seat 46 towards the outlet end 10b.

In one mode of operation of the injector 10, the third check 20 is biased against the fourth seat 60 by the second end 22b of the first body section 22 which acts as a fourth biasing member 23 on the third check 20. The first body section 22 biases the third check 20 in the direction opposite the bias force of the third spring 62. Thus, in this mode, the third check 20 is retained or compressed between the first and second body sections 22, 24. This retention or compression of the third check 20 between the first and second body sections 22, 24 is achieved by tightening the threaded connection between the two body sections 22, 24 whereby the two body sections 22, 24 are moved longitudinally closer together. Thus, while being retained or compressed between the third spring 62 and first body section 22, the third check 20 is biased against each of the third and the fourth seats 46, 60 thereby blocking respective orifices in the third and fourth seats 46, 60. This mode of operation of the injector 10 is a locked mode in which the injector 10 cannot be used for allowing fluid to pass through the fluid conduit 14. In the locked mode, the third check 20 blocks the fluid conduit 14 even if pressure is applied on the third check 20 in the first direction, i.e. from the first end 10a towards the second end 10b, attempting to overcome the bias force of the third spring 62. This is because the third check 20 is biased against the fourth seat 60 by the first body section 22 in the direction opposite the bias force of the third spring 62 and in the same direction as the pressure which attempts to overcome the bias force of the third spring 62. Thus, the orifice of the fourth seat 60 remains blocked and passage of fluid through the fluid conduit 14 is prevented.

In another mode of operation, by loosening the threaded connection between the two body sections 22, 24, the second end 22b of the first body section 22 is moved away from its position in which the second end 22b of the first body section 22 biases the third check 20 against the fourth seat 60. At the same time, the third spring 62 continues to bias the third check 20 against the third seat 46. Thus, the third check 20 is moved away from the fourth seat 60 and the orifice of the fourth seat 60 is unblocked. This mode of operation of the injector 10 is a working mode in which the injector 10 can be used for allowing fluid to pass through the fluid conduit 14. In the working mode, the bias force of each of the first, second and third spring 40, 66, 62 can be overcome by application of a predetermined pressure in the first direction, i.e. from the first end 10a towards the second end 10b, on the respective first, second and third check 16, 18, 20 to move said check away from its seat 42, 64, 46 and unblock the orifice of the seat 42, 64, 46 so that fluid can pass through the fluid conduit 14.

In use, the outlet end 10b of the injector 10 is inserted into an injector port of a valve (not shown) in a known fashion. The cap portion 70 is removed and the first body section 22 can be rotated by a user to move the second end 22b of the first body section 22 away from its position in which the second end 22b of the first body section 22 biases the third check 20 against the fourth seat 60. At the same time, the third spring 62 continues to bias the third check 20 against the third seat 46 maintaining the seal and blocking the fluid conduit 14. As the third check 20 is moved away from the fourth seat 60 the orifice of the fourth seat 60 is unblocked bringing injector 10 into a working mode in which the injector 10 can be used for allowing fluid to pass through the fluid conduit 14 by applying fluid pressure on the checks 16, 18, 20 in the direction from the first end 10*a* towards the second end 10*b*.

Modifications and variations are possible within the scope of the appended claims.

The invention claimed is:

1. A valve injector comprising:
a body defining a fluid conduit;
the fluid conduit accommodating first, second and third checks;
the first check being disposed within the fluid conduit towards a first end of the injector;
the second check being disposed towards a second end of the injector, distally from the first end; and
the third check being located between the first and second check;
wherein each check is biased against a respective first, second, and third seat located in the fluid conduit by a respective first, second, and third biasing member, blocking a respective orifice in the seat and thereby preventing flow through the fluid conduit;
wherein the first, second, and third biasing members are first, second, and third biasing springs;
wherein a bias force of each of the first, second, and third biasing member is such that the bias force is overcomeable by the application of a predetermined pressure in a first direction against the bias force on the respective first, second, and third check whereby each respective check is moved away from the first seat, the second seat, and the third seat, respectively and the orifice of the respective seat is unblocked, wherein upon removal of the pressure, each respective check is operable to return into a position blocking the orifice in the respective seat;
wherein the body comprises:
a fourth seat located in the fluid conduit longitudinally spaced from the third seat; and a fourth biasing member; wherein the fourth biasing member is defined by a second end of a first body section;
wherein, in one mode of operation, the third check is biased against the fourth seat by the fourth biasing member in a direction opposite the bias force of the third biasing member, whereby the third check is retained between the third and fourth biasing members and is biased against the third and the fourth seats thereby blocking respective orifices in the third and the fourth seats, the one mode of operation being a locked mode where the injector cannot be used for allowing fluid to pass through the fluid conduit;
wherein in a second mode of operation, the fourth biasing member is axially spaced from a position in which the fourth biasing member biases the third check against the fourth seat, while the third biasing member biases the third check against the third seat, whereby the third check is axially spaced from the fourth seat and the orifice of the fourth seat is unblocked;
the second mode of operation of the injector being a working mode in which the injector can be used for allowing fluid to pass through the fluid conduit; and
the bias force of each of the first, second and third biasing member can be overcome by application of a predetermined pressure in the first direction on the respective first, second, and third check whereby the respective check is moved away from respective seat and the orifice of the seat is unblocked whereby fluid can pass through the fluid conduit.

2. The valve injector as claimed in claim 1, wherein the body is formed from first and second body sections, wherein the first and the second body sections are connected such that the first and second body sections are movable longitudinally relative to each other.

3. The valve injector as claimed in claim 2, wherein the first and second body sections are connected via a threaded connection.

4. The valve injector as claimed in claim 3, wherein the first and second body sections are prevented from being completely disconnected by a stop member; wherein the stop member is a mechanical connector.

5. The valve injector as claimed in claim 2, wherein the first check and the first seat are disposed within the first body section.

6. The valve injector as claimed in claim 5, wherein the second check and the second seat are disposed within the second body section.

7. The valve injector as claimed in claim 6, wherein the third check is disposed adjacent a junction between first and second body sections.

8. The valve injector as claimed in claim 1, wherein:
the third seat is provided in the first body section;
the fourth seat is provided in the second body section; and
the first body section acts as the fourth biasing member whereby in the locked mode, the third check is retained or compressed between the first and second body sections.

9. The valve injector as claimed in claim 8, wherein retention or compression of the third check between the first and second body sections is achieved upon tightening a connection between the two body sections whereby the two body sections are moved longitudinally closer together.

10. The valve injector as claimed in claim 8, wherein:
upon loosening a connection between the two body sections, the first body section, acting as the fourth biasing member, is axially spaced away from a position in which the first body section biases the third check against the fourth seat on the second body section;
the third biasing member continues to bias the third check against the third seat on the first body section; and
the third check becomes axially spaced from the fourth seat and the orifice of the fourth seat is unblocked thereby bringing the injector into the working mode of operation.

* * * * *